(12) United States Patent
Nagy et al.

(10) Patent No.: US 7,781,549 B2
(45) Date of Patent: Aug. 24, 2010

(54) OLEFIN POLYMERIZATION PROCESS

(75) Inventors: Sandor Nagy, Naperville, IL (US); Barbara M. Tsuie, Cincinnati, OH (US)

(73) Assignee: Equistar Chemicals, LP, Houston, TX (US)

( * ) Notice: Subject to any disclaimer, the term of this patent is extended or adjusted under 35 U.S.C. 154(b) by 499 days.

(21) Appl. No.: 11/899,090

(22) Filed: Sep. 4, 2007

(65) Prior Publication Data

US 2009/0062487 A1    Mar. 5, 2009

(51) Int. Cl.
*C08F 4/642* (2006.01)
*C08F 4/64* (2006.01)
*C08F 4/6592* (2006.01)
*B01J 31/22* (2006.01)

(52) U.S. Cl. .................. 526/161; 526/133; 526/134; 526/160; 526/165; 526/348; 526/943; 502/103; 502/152; 502/155

(58) Field of Classification Search .................. 526/160, 526/161, 165, 170, 172, 348, 133, 134, 943
See application file for complete search history.

(56) References Cited

U.S. PATENT DOCUMENTS

| | | | |
|---|---|---|---|
| 5,153,157 A | 10/1992 | Hlatky et al. | 502/117 |
| 5,198,401 A | 3/1993 | Turner et al. | 502/155 |
| 5,241,025 A | 8/1993 | Hlatky et al. | 526/129 |
| 5,414,180 A | 5/1995 | Geerts et al. | 585/525 |
| 5,648,440 A | 7/1997 | Sugano et al. | 526/132 |
| 6,211,311 B1 | 4/2001 | Wang et al. | 526/131 |
| 6,232,260 B1 | 5/2001 | Nagy et al. | 502/155 |
| 6,451,724 B1 | 9/2002 | Nifant'ev et al. | 502/103 |
| 6,559,251 B1 | 5/2003 | Wang et al. | 526/127 |
| 6,908,972 B2 | 6/2005 | Tsuie et al. | 526/160 |
| 7,196,147 B2 | 3/2007 | Wang et al. | 526/114 |

FOREIGN PATENT DOCUMENTS

WO   WO 2005/000920   1/2005
WO   WO 2005/005499   1/2005

OTHER PUBLICATIONS

Stadler, et al., *Macromolecules* 2006, 39, 1474-1482.

*Primary Examiner*—Caixia Lu
(74) *Attorney, Agent, or Firm*—John Tyrell; Jonathan L. Schuchardt

(57) ABSTRACT

A slurry process for polymerizing ethylene is disclosed. The process comprises polymerizing ethylene in the presence of an α-olefin and a catalyst comprising an activator and a supported bridged indeno[1,2-b]indolyl zirconium complex. The process produces polyethylene characterized by good incorporation of the α-olefin and low long-chain branching. The process is capable of forming high-molecular-weight polyethylene and has good hydrogen sensitivity.

18 Claims, No Drawings

OLEFIN POLYMERIZATION PROCESS

FIELD OF THE INVENTION

This invention relates to a slurry process for making ethylene copolymers. The process provides polyethylene with controlled, high molecular weight and a low level of long-chain branching.

BACKGROUND OF THE INVENTION

Many olefin polymerization catalysts are known, including conventional Ziegler-Natta catalysts. While these catalysts are inexpensive, they exhibit low activity and are generally poor at incorporating α-olefin comonomers. The large variety of active sites in Ziegler-Natta catalysts makes it difficult to control polymer architecture. To improve polymer properties, single-site catalysts, in particular metallocenes are beginning to replace Ziegler-Natta catalysts.

Slurry reactors are in widespread use for production of polyethylene homo- and copolymers. Slurry reactors include stirred-tank reactors and water-jacketed tubular reactors arranged in a series of continuous horizontal or vertical loops. A "slurry solvent" in which polyethylene has low solubility constitutes the continuous phase in such reactors. The slurry is intensely stirred in a continuous stirred-tank reactor or series of reactors or, in the case of slurry loop reactors, is driven around the loop at relatively high speed by one or more rather massive pumps. Ethylene, supported catalyst, comonomers, and processing additives are injected into the reactor where polymerization takes place, creating a slurry of polyethylene in solvent.

U.S. Pat. Nos. 6,232,260 and 6,451,724 disclose the use of transition metal catalysts based upon indenoindolyl ligands. Indenoindolyl catalysts are remarkably versatile because substituent effects and bridging changes can often be exploited to provide polymers with tailored physical or mechanical properties. Unbridged indenoindolyl complexes (as exemplified in the '260 patent) usually provide favorable activity although they sometimes fail to provide polymers having high enough molecular weights. Bridged indenoindolyl complexes (as taught, e.g., in U.S. Pat. No. 6,908,972) readily copolymerize α-olefins and provide polymers, with varying levels of long-chain branching. Some of the examples (e.g. Example 15 reports no long-chain branching and $M_w$=90,700) have very low long-chain branching (for a discussion of long-chain branching in polyethylene, see *Macromolecules* 39 (2006) 1474 and references cited therein).

Despite the considerable experience with single-site catalysts generally and indenoindolyl catalysts in particular, there is a need for improvement. Often, catalysts that provide good incorporation of α-olefins also produce polyethylene with too much long-chain branching, which adversely impacts polymer properties. A desirable process would easily incorporate α-olefins in order to control density and other properties. Many properties improve with increasing molecular weight, so a process capable of forming high-molecular-weight polyethylene is also desirable. Finally, it is also important to be able to adjust polymer molecular weight, preferably by adding hydrogen to the polymerization; a process with good hydrogen sensitivity is robust and versatile.

Thus, some processes incorporate α-olefins well, but have high long-chain branching; others provide polyolefins with little or no long-chain branching, but have inferior incorporation of α-olefins. Some processes incorporate α-olefins and give polymers with low long-chain branching, but are not capable of forming high-molecular-weight polyethylene or have low activity. Some processes can give high-molecular-weight polyethylene; others have good hydrogen sensitivity. However, a slurry polymerization process having all four of these qualities is apparently not known and a compromise must be made. A valuable process would enable all four attributes.

SUMMARY OF THE INVENTION

The invention is a low-temperature slurry process for polymerizing ethylene in the presence of a $C_3$-$C_{10}$ α-olefin and a supported bridged indeno[1,2-b]indolyl zirconium complex. The process provides polyethylene with good incorporation of the α-olefin and a low level of long-chain branching, as indicated by a viscosity enhancement factor (VEF) of less than 2.0. The process is capable of forming polyethylene having a weight-average molecular weight greater than 250,000. Additionally, the process has good hydrogen sensitivity such that introduction of 0.82 mmoles of hydrogen per mole of ethylene into the liquid phase reduces the weight-average molecular weight by at least 60%.

The combination of attributes—good comonomer incorporation, ability to make high-molecular-weight polymers, low long-chain branching, and ability to control molecular weight using hydrogen—strikes an uncommon but valuable balance, and it requires judicious selection of process conditions and the indenoindolyl zirconium complex.

DETAILED DESCRIPTION OF THE INVENTION

The invention is a slurry process for polymerizing ethylene in the presence of a $C_3$-$C_{10}$ α-olefin. Suitable $C_3$-$C_{10}$ α-olefins include, for example, propylene, 1-butene, 1-hexene, 1-octene, and mixtures thereof. Preferred $C_3$-$C_{10}$ α-olefins are 1-butene, 1-hexene, and 1-octene. The polymerization is performed at a temperature within the range of 40° C. to 90° C., more preferably from 50° C. to 85° C.

The slurry polymerization is performed in the presence of a catalyst comprising an activator and a supported complex. Complexes useful for process of the invention are dimethylsilyl-bridged indeno[1,2-b]indolyl zirconium complexes. Not all complexes of this type are suitable, however. Suitable complexes have a structure selected from the group consisting of:

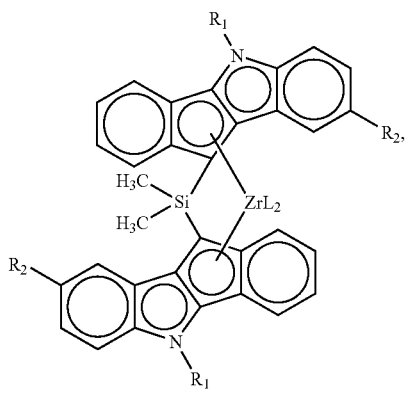

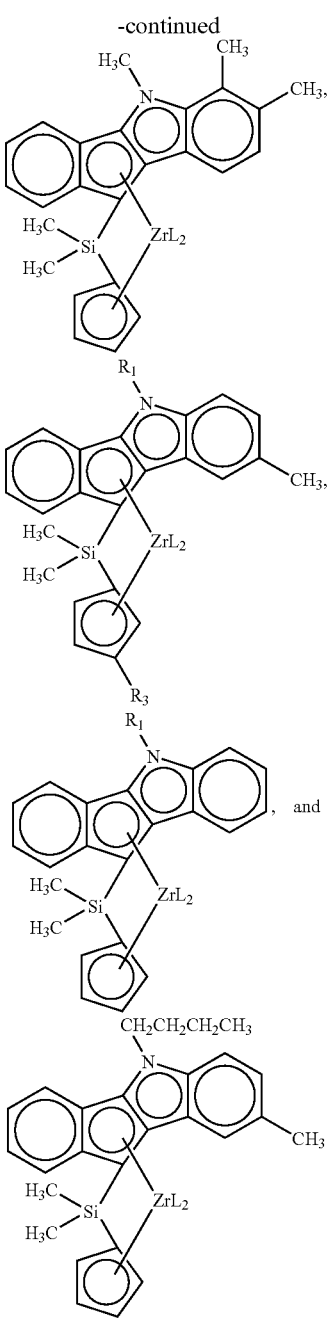

in which each $R_1$ is independently selected from the group consisting of $C_1$-$C_6$ n-alkyl; each $R_2$ is independently selected from the group consisting of H and $C_1$-$C_{10}$ hydrocarbyl; $R_3$ is $C_1$-$C_6$ alkyl; and each L is independently selected from the group consisting of halide, alkoxy, aryloxy, siloxy, alkylamino, and $C_1$-$C_{30}$ hydrocarbyl.

As those skilled in the art will appreciate, the complexes shown above might be prepared as a single stereoisomer or as a mixture of stereoisomers. Throughout this patent application, a given structure is meant to encompass all possible stereoisomers of that complex, alone or in combination, and no structure is intended to be limited to any one particular stereoisomer.

Preferably, $R_1$ is methyl. Preferably each L is Cl. Preferably, the complex has a structure selected from the group consisting of:

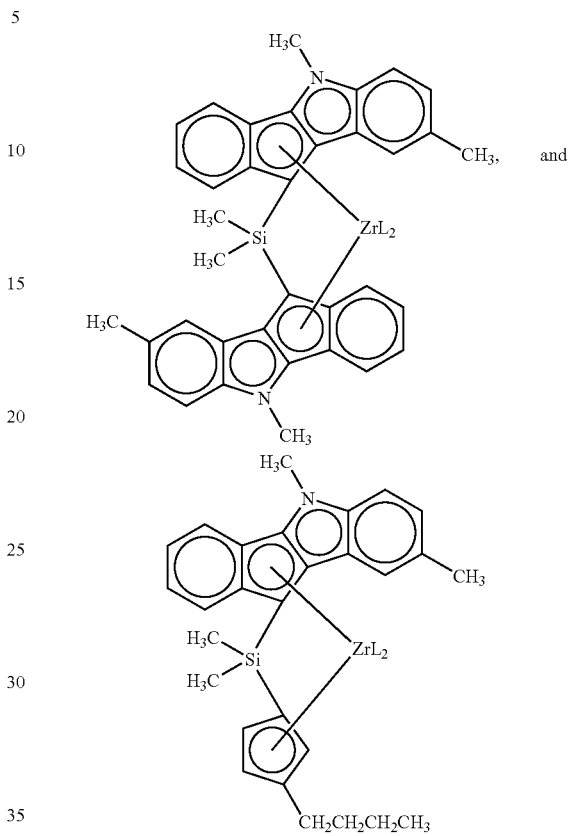

wherein each L is independently selected from the group consisting of halide, alkoxy, aryloxy, siloxy, alkylamino, and $C_1$-$C_{30}$ hydrocarbyl.

Indeno[1,2-b]indolyl ligands are conveniently generated by deprotonating an indeno[1,2-b]indole compound using a potent base. Suitable indeno[1,2-b]indolyl ligands and ways to name, synthesize, and incorporate them into a dimethylsilyl-bridged zirconium complex have been described in considerable detail elsewhere; see, for example, U.S. Pat. Nos. 6,232,260, 6,908,972 and 6,559,251, the teachings of which are incorporated herein by reference, and the references cited therein.

Example 1 of U.S. Pat. No. 6,908,972 illustrates a particularly useful way to prepare complexes suitable for use in the inventive process. Usually, the indeno[1,2-b]indole precursor having the desired substituents is prepared by reacting the appropriate 1-indanone and arylhydrazine precursors. The indole nitrogen can then be alkylated. Deprotonation followed by reaction with dichlorodimethylsilane conveniently attaches silicon at the indenyl methylene. Reaction of the monochlorosilane with a cyclopentadienyl or indenoindolyl anion provides the desired bridged ligand precursor. Double deprotonation and combination of the resulting dianion with a zirconium source affords the ultimate target, a dimethylsilyl-bridged indeno[1,2-b]indolyl zirconium complex.

An activator is used in the polymerization. The activator helps to ionize the zirconium complex and activate the catalyst. Suitable activators are well known in the art. Examples include alumoxanes (methyl alumoxane (MAO), PMAO, ethyl alumoxane, diisobutyl alumoxane), alkylaluminum compounds (triethylaluminum, diethylaluminum chloride, trimethylaluminum, triisobutylaluminum), and the like. Suitable activators include salts that contain non-nucleophilic anions. These compounds generally consist of bulky ligands attached to boron or aluminum. Examples include lithium tetrakis(pentafluorophenyl)borate, lithium tetrakis(pentafluorophenyl)aluminate, anilinium tetrakis(pentafluorophenyl)borate, trityl tetrakis(pentafluorophenyl)borate, and the like. Suitable activators also include organoboranes, which include boron and one or more alkyl, aryl, or aralkyl groups. Suitable activators include substituted and unsubstituted trialkyl and triarylboranes such as tris(pentafluorophenyl)borane, triphenylborane, tri-n-octylborane, and the like. These and other suitable boron-containing activators are described in U.S. Pat. Nos. 5,153,157, 5,198,401, and 5,241,025, the teachings of which are incorporated herein by reference. Suitable activators also include aluminoboronates—reaction products of alkyl aluminum compounds and organoboronic acids—as described in U.S. Pat. Nos. 5,414,180 and 5,648,440, the teachings of which are incorporated herein by reference. Alumoxane activators, such as MAO, are preferred.

The optimum amount of activator needed relative to the amount of zirconium complex depends on many factors, including the nature of the complex and activator, the desired reaction rate, the kind of polyolefin product, the reaction conditions, and other factors. Generally, however, when the activator is an alumoxane or an alkyl aluminum compound, the amount used will be within the range of about 0.01 to about 5000 moles, preferably from about 10 to about 500 moles, and more preferably from about 10 to about 200 moles, of aluminum per mole of zirconium. When the activator is an organoborane or an ionic borate or aluminate, the amount used will be within the range of about 0.01 to about 5000 moles, preferably from about 0.1 to about 10 moles, of activator per mole of zirconium.

The catalyst comprises a supported zirconium complex. The support is preferably a porous material such as inorganic oxides and chlorides, and organic polymer resins. Preferred inorganic oxides include oxides of Group 2, 3, 4, 5, 13, or 14 elements. Preferred supports include silicas, aluminas, silica-aluminas, magnesias, titanias, zirconias, magnesium chloride, and crosslinked polystyrene. Most preferred is silica. The silica is preferably treated thermally, chemically, or both prior to use to reduce the concentration of surface hydroxyl groups. Thermal treatment consists of heating (or "calcining") the silica in a dry atmosphere at elevated temperature, preferably greater than about 100° C., and more preferably from about 150 to about 600° C., prior to use. A variety of different chemical treatments can be used, including reaction with organo-aluminum, -magnesium, -silicon, or -boron compounds. See, for example, the techniques described in U.S. Pat. No. 6,211,311, the teachings of which are incorporated herein by reference. The amount of complex added is preferably from 0.01 to 0.5 mmol per gram of support.

In one suitable catalyst preparation method, a solution of the complex is combined with the support. The mixture is stirred in an inert atmosphere at a temperature within the range of 0° C. to 120° C., more preferably from 20° C. to 40° C. The optimum stirring time will vary somewhat, depending upon the amounts of solvent and support, but it should be long enough to ensure good mixing. Preferably, the stirring time is from 2 to 60 minutes. Stirring longer than 60 minutes should not decrease activity, but it is unnecessary. Stirring 30 minutes at room temperature is convenient and gives good results. If a large amount of solvent is used, the mixture is a slurry and it is convenient to remove some of the solvent to prepare a free-flowing solid. This can be done at room temperature by applying a vacuum. Alternatively, an incipient wetness technique can be used in which a small amount of solvent is used to dissolve the complex and the solution is added to the support material. The mixture remains a free-flowing solid without solvent removal. The mixture can be used as is or residual solvent may be removed.

Different methods for addition of the activator and for combining the complex with the support may be used. In one suitable method, the activator is premixed with the support and the complex is added to the mixture of support and activator. Optionally, the activator is combined with the complex and the mixture of activator and complex is added to the support. Alternatively, a portion of the activator is combined with the support and a mixture of the complex and the remaining amount of the activator is added to the support.

The slurry process produces polyethylene with good incorporation of the $\alpha$-olefin. The amount of $\alpha$-olefin incorporation will depend upon the particular $\alpha$-olefin and the amount added to the polymerization. The level of $\alpha$-olefin incorporation can be easily measured by FT-IR spectroscopy. Each molecule of $\alpha$-olefin incorporated gives one tertiary carbon atom. "Good incorporation" of the $\alpha$-olefin is indicated by a polyethylene density value that drops steadily upon increasing the content of $\alpha$-olefin in the reaction mixture. More quantitatively, this generally means that when 63 mmoles of 1-butene per mole of ethylene is introduced into the liquid phase, the resulting polyethylene has more than 5 tertiary carbons per 1000 carbons.

The process produces polyethylene with little or no long-chain branching. As described in *Macromolecules* 39 (2006) 1474, rheological measurements can be used to estimate the amount of long-chain branching. At low shear rates, the viscosity of polyethylene with long-chain branching is higher than the viscosity of linear polyethylene of equivalent molecular weight. We can use a viscosity enhancement factor (VEF) as an indication of long-chain branching. The viscosity enhancement factor can be determined from the ratio of the measured viscosity at a fixed temperature and frequency to the viscosity predicted for linear polyethylene of equivalent molecular weight. Preferably, the temperature used is 190° C. and the frequency is 0.025 rad/s. For the purpose of this application, by "viscosity enhancement factor" we mean the ratio of the measured viscosity at 190° C. and a frequency of 0.025 rad/s to the viscosity predicted for linear polyethylene of equivalent molecular weight. The viscosities of more than forty linear polyethylene samples of varying weight-average molecular weight were measured to develop the relationship between $M_w$ and viscosity at 0.025 rad/s. The viscosity prediction for linear polyethylene=$(2.1 \times 10^{-14})(M_w^{3.66})$. A linear polyethylene will have a viscosity enhancement factor of about 1, while a sample of polyethylene known to have substantial long-chain branching had a viscosity enhancement factor of 15. By "low long-chain branching," we mean a viscosity enhancement factor of less than 2.0. Such polyethylenes are mostly linear, and the rheological effect of any long-chain branching is insubstantial. For more details about how to measure and compute VEF, see U.S. Pat. Appl. Publ. No. 2009/0061135, the teachings of which are incorporated herein by reference.

The inventive slurry process can provide polyethylene having a weight-average molecular weight greater than 250,000, preferably greater than 400,000. Too often, a process is unable to provide polyethylenes with high enough molecular weight (or low enough melt index), and this limits its usefulness. The inventive process can provide the desirable high molecular weight.

Just as important as the ability to make a high-molecular-weight polymer, however, is the ability to control molecular weight by adding hydrogen into the process. The inventive slurry process has good hydrogen sensitivity and even low levels of hydrogen reduce the molecular weight. Increased levels of hydrogen further reduce the molecular weight. The hydrogen sensitivity can be judged by comparing polymerizations with and without added hydrogen. By "good hydrogen sensitivity," we mean that introduction of 0.82 mmoles of hydrogen per 1 mole of ethylene into the liquid phase reduces the weight-average molecular weight by at least 60%.

Preferably, the process uses a highly active catalyst. A convenient measure of activity is the amount of polyethylene formed per hour per gram of zirconium used. Because factors such as temperature or time can influence the measured activity, it is convenient to compare measured activities with those obtained by using a known complex under similar polymerization conditions. One such readily available complex is bis(cyclopentadienyl)zirconium dichloride.

As defined herein, "activity ratio" means the value of $A_1/A_2$, where $A_1$ is the activity (grams of polymer per gram of Zr per hour) of a complex of interest that is supported and activated as described in Example 1 and is then used for a slurry polymerization in the presence of 1-butene and hydrogen as described in Example 1; and $A_2$ is the activity of bis(cyclopentadienyl)zirconium dichloride that is supported and activated as described in Example 1 and is then used for a slurry polymerization as described in Example 1 except that 1-butene and hydrogen are omitted from the slurry polymerization.

Thus, the baseline experiment with $Cp_2ZrCl_2$ is an ethylene homopolymerization performed in the absence of hydrogen. Catalysts useful in the slurry process of the invention preferably have an activity ratio as defined herein greater than 2, more preferably greater than 3.

Complex concentrations used for the olefin polymerization depend on many factors. Preferably, however, the concentration ranges from about 0.01 micromoles zirconium per liter to about 100 micromoles per liter. Olefin partial pressures normally range from about 0.1 MPa to about 350 MPa. More preferred is the range from about 0.1 MPa to about 7 MPa. Polymerization times depend on the type of process, the complex concentration, and other factors. Generally, polymerizations are complete within several seconds to several hours.

The following examples merely illustrate the invention. Those skilled in the art will recognize many variations that are within the spirit of the invention and scope of the claims.

Example 1

A 1-L flask equipped with a stir bar is charged with 5,8-dimethyl-5,10-dihydroindeno[1,2-b]indole (26.5 g, 114 mmol) and diethyl ether (240 mL). The flask is equipped with a straight-tip gas inlet adapter with rubber septum and a reflux condenser. The mixture is cooled to 0° C., and n-butyllithium (75.0 mL, 1.6 M in hexanes, 120 mmol) is added by cannula. The mixture initially turns bright yellow, then clear orange when base addition is complete. After 20 minutes, a thick yellow paste forms. The mixture is warmed to room temperature and maintained under nitrogen overnight. A solution of dichlorodimethylsilane (7.0 mL, 58 mmol) in diethyl ether (120 mL) is added at room temperature. The mixture warms, and the slurry darkens. Once addition is complete, the mixture is brought to reflux for 3 hours and is then cooled to room temperature. Water (250 mL) is added, a solid separates from the organic layer, and the mixture is filtered. The solid is washed with diethyl ether (300 mL) and dried under vacuum to afford a gray solid (27.8 g, 46.9%).

A portion of the gray solid (3.56 g, 6.80 mmol) is slurried in 100 mL of diethyl ether and n-butyllithium (6.0 mL, 2.5 M in hexanes, 15.0 mmol) is added by syringe to the slurry. The mixture is maintained at room temperature overnight and the color changes from yellow to orange. Methylene chloride (approximately 30 mL) is added to zirconium tetrachloride (1.58 g, 6.79 mmol) followed by diethyl ether (approximately 50 mL) to give a slightly turbid mixture. The dianion is added and the mixture turns deep magenta and a precipitate forms. The mixture is stirred for 48 hours. The mixture is filtered and the dark purple residue is extracted with methylene chloride (approximately 50 mL) and filtered. The filtrate is concentrated to approximately 70 mL and maintained to form a precipitate, which is filtered and dried. The NMR spectra reveals that the purple residue and the "crystallized" material are the same complex, 1,1-dimethylsilyl-bis-(5,10-dihydrido-5,8-dimethyl-indeno[1,2-b]indolyl)zirconium dichloride 1.

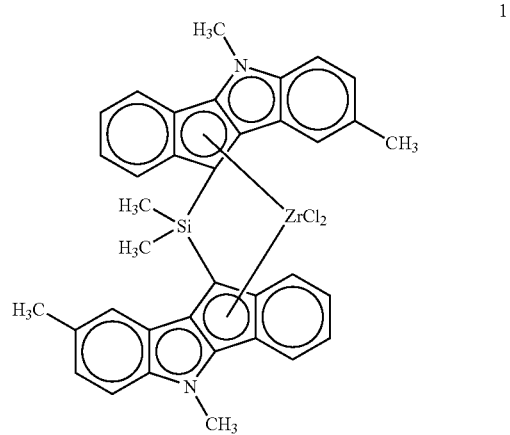

Support and Activation of Complex 1: Methylalumoxane (2.2 mL of 4.21 M solution in toluene, product of Albemarle) is added at room temperature to a slurry of 0.75 g of silica (G3, available from Fuji Silysia Chemical Ltd., calcined at 250° C. for 12 hours) in 4 mL of anhydrous toluene. The resulting stirred slurry is heated at 80° C. for two hours and cooled to ambient temperature. A 0.0926 mmole sample of dry complex, 1 (Al/Zr=100) is added to the slurry and stirred for 2 hours at ambient temperature. An aliquot of this catalyst slurry is used while fresh (1 to 3 days) in polymerization tests.

Slurry Polymerization with Supported Complex 1: Isobutane (1 L), 1-butene (5 mL) and 1M triisobutylaluminum solution in hexanes (1 mL) are added to a dry, nitrogen-purged stainless-steel stirred and jacketed autoclave reactor. The reactor is heated to 70° C. and pressurized to 1.7 MPa with ethylene. The polymerization reaction is started by injecting an aliquot of catalyst sample. The temperature is maintained at 70° C. throughout the test. Ethylene is supplied on demand to maintain the reactor pressure of 1.7 MPa. The polymerization is terminated by venting the autoclave after consumption of about 20 g of ethylene. The polyethylene sample is dried and tested.

The viscosity enhancement factor (VEF) is determined to be 1.94. By GPC, the polyethylene has a weight-average molecular weight ($M_w$) of 1,000,000 and a $M_w/M_n$ of 4.26. Branching is determined by FT-IR spectroscopy to be 5.77 tertiary carbons per 1000 carbons. The activity ratio, computed as discussed hereinabove, is 6.02. When the slurry polymerization is repeated using hydrogen added from a 7-mL vessel at 4.1 MPa to effect a pressure drop of 0.7 MPa (calculated to be 0.82 mmole hydrogen per mole of ethylene), the $M_w$ is reduced by 86%.

Example 2

A 1-L flask is charged with lithium n-butylcyclopentadienide (15.6 g, 0.121 mol) and 5,8-dimethyl-5,10-dihydroindeno[1,2-b]indolyl-dimethylsilyl chloride (39.7 g, 0.120 mol). Tetrahydrofuran (120 mL) is added at room temperature to give a purple mixture. The volatiles are removed under vacuum after 48 hours, and hexanes (200 mL) are added and maintained overnight. The mixture is filtered over a pad of Celite, and the volatiles removed under vacuum to afford an oily residue (49.3 g, 0.121 mol). The oil is dissolved in diethyl ether (600 mL), and n-butyllithium (105 mL, 2.5 M, 0.261 mol) is added dropwise and stirred overnight. A precipitate occurs, and the solids are filtered and washed with diethyl ether (approximately 100 mL) followed by hexanes (150 mL). The solid dilithium salt is dried under vacuum (43.5 g, 85.6%).

Zirconium tetrachloride (6.28 g, 0.0270 mol) is suspended in methylene chloride (200 mL) and diethyl ether (100 mL) is added slowly to give a clear solution. A portion of the dilithium salt (11.4 g, 0.0271 mol) is added as a solid with vigorous stirring, and the mixture turns red. The stirring is maintained overnight and the slurry is filtered. The filtrate is concentrated to approximately 175 mL, and the resulting solid precipitate is isolated by filtration and dried (0.135 g). The second filtrate is further concentrated to approximately 100 mL and maintained at room temperature overnight. A second crop is filtered and dried (1.65 g). The solids are combined to afford the desired dimethylsilyl-bridged indeno[1,2-b]indolyl zirconium dichloride, i.e., complex 2.

The complex is supported and used in a slurry polymerization in similar fashion as in Example 1. The results are reported in Table 1.

Example 3

Complex 3 is prepared in similar fashion as complexes 1 and 2.

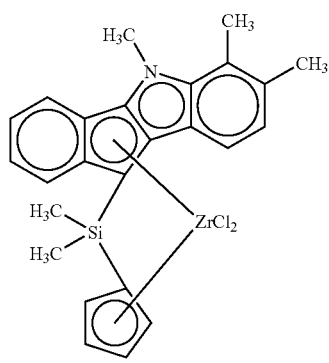

The complex is supported and used in a slurry polymerization in similar fashion as in Example 1. The results are reported in Table 1.

Example 4

Complex 4 is prepared in similar fashion as complexes 1 and 2.

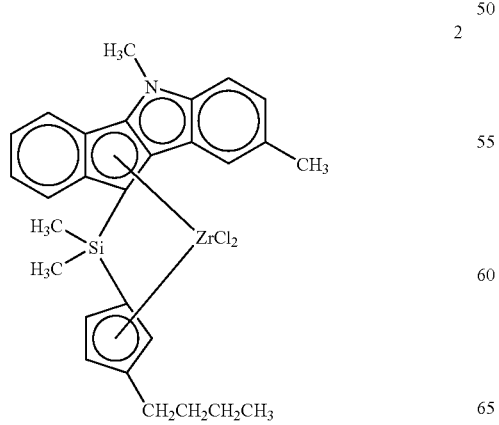

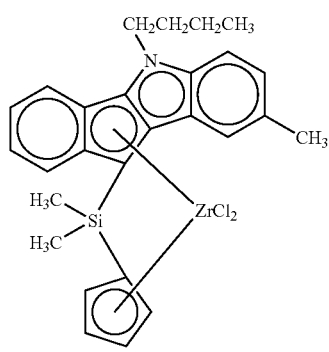

The complex is supported and used in a slurry polymerization in similar fashion as in Example 1. The results are reported in Table 1.

Example 5

Complex 5 is prepared in similar fashion as complexes 1 and 2.

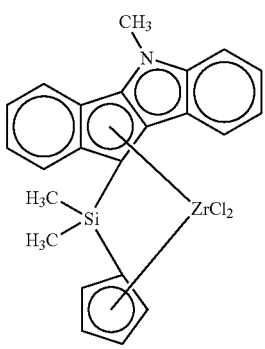

5

The complex is supported and used in a slurry polymerization in similar fashion as in Example 1. The results are reported in Table 1.

Comparative Examples 6-22

Complexes 6-10 and 12-22 are prepared in similar fashion as complexes 1 and 2 except that $CH_2$-bridged complex 7 is prepared as in U.S. Pat. No. 7,196,147 (see column 6). Complex 11 is purchased from Sigma-Aldrich, Inc. Each complex is supported and used in a slurry polymerization in similar fashion as in Example 1. The results are reported in Table 1.

TABLE 1

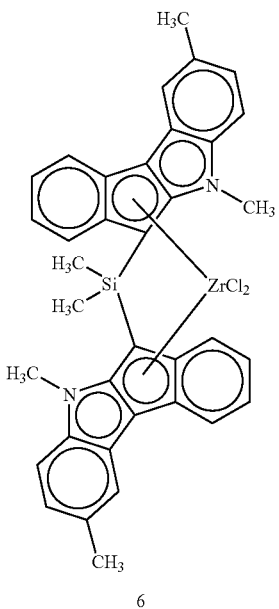

6

TABLE 1-continued

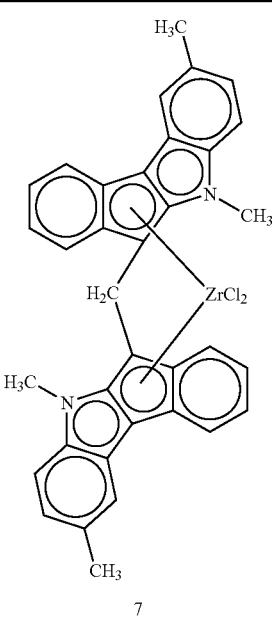

7

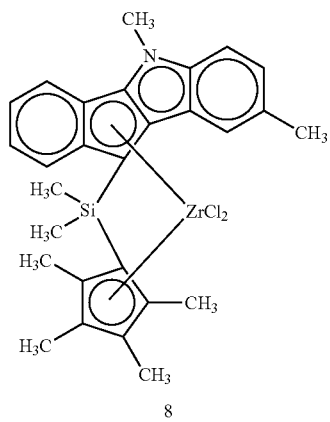

8

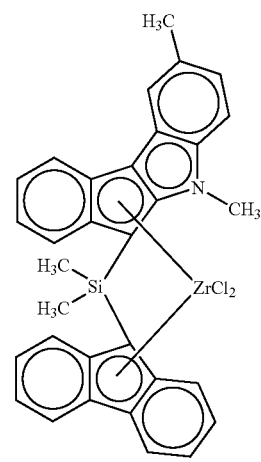

9

TABLE 1-continued
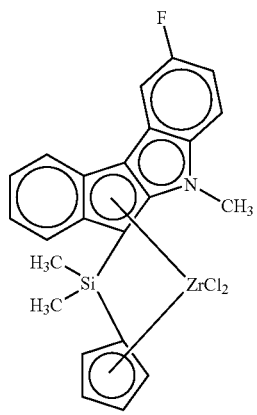
10
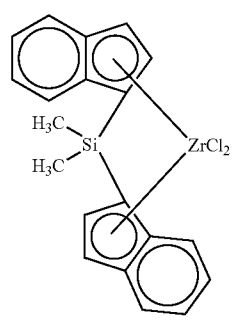
11
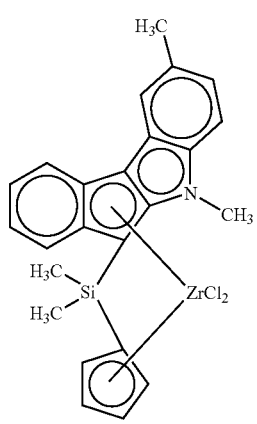
12
TABLE 1-continued
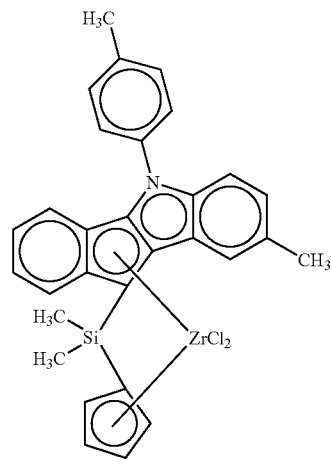
13
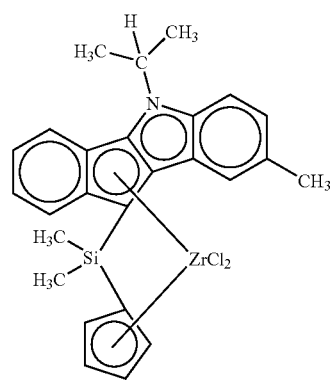
14
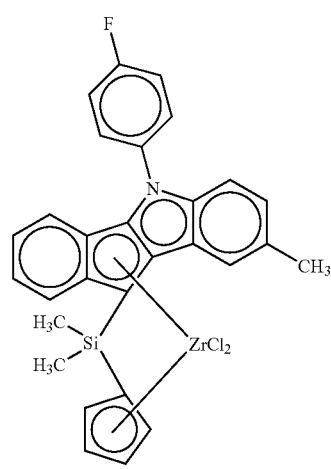
15

TABLE 1-continued
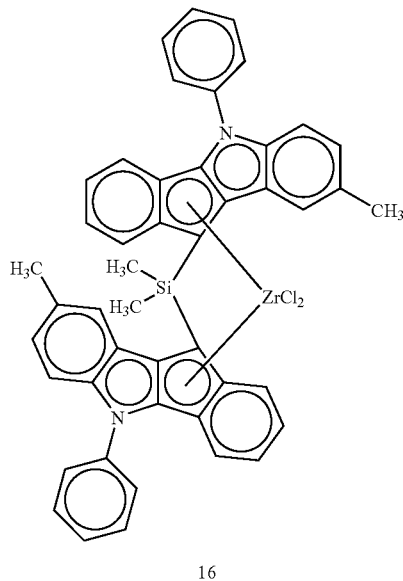
16
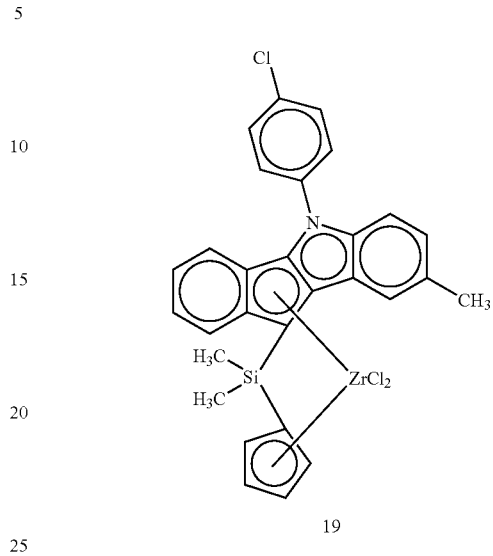
19
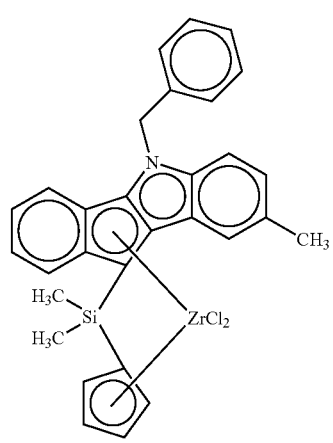
17
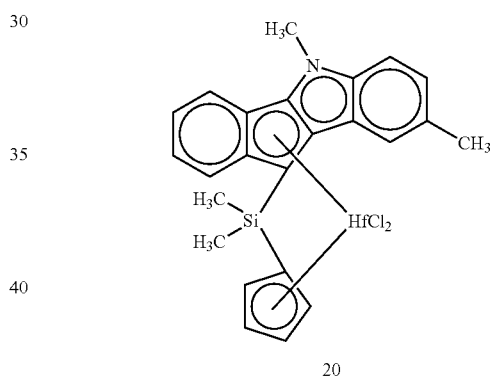
20
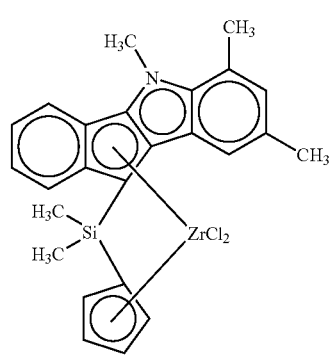
18
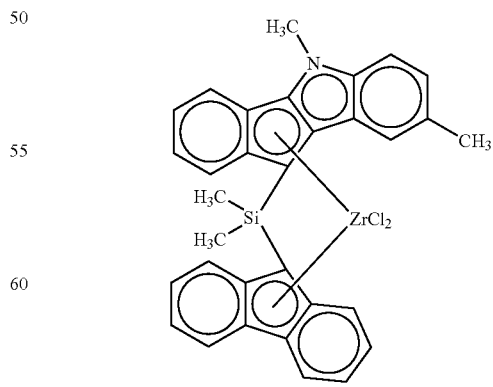
21

TABLE 1-continued

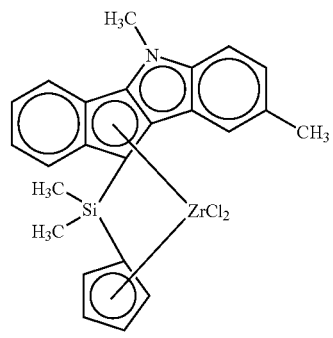

22

Polymerizations

| Example | VEF | $M_w$ | $M_w$ reduction with $H_2$ | $M_w/M_n$ | Tertiary C/ 1000 C | Activity Ratio |
|---|---|---|---|---|---|---|
| 1 | 1.94 | 1,000,000 | 86% | 4.26 | 5.77 | 6.02 |
| 2 | 1.60 | 289,000 | 75% | 3.96 | 7.27 | 4.98 |
| 3 | 1.53 | 522,000 | 90% | 4.69 | 7.50 | 1.47 |
| 4 | 0.99 | 415,000 | 86% | 3.17 | 8.13 | 1.08 |
| 5 | 0.88 | 543,000 | 89% | 3.73 | 5.47 | 1.61 |
| C6 | 10.0 | 273,000 | 64% | 3.13 | 8.70 | 7.16 |
| C7 | 10.7 | 250,000 | 52% | 4.12 | 20.7 | 5.51 |
| C8 | 5.63 | 372,000 | 77% | 2.29 | 4.97 | 2.36 |
| C9 | 5.40 | 344,000 | 6% | 2.65 | 5.53 | 2.11 |
| C10 | 4.65 | 236,000 | 83% | 3.98 | 8.53 | 3.45 |
| C11 | 4.61 | 257,000 | 66% | 5.10 | 12.2 | 6.87 |
| C12 | 4.40 | 198,000 | 81% | 3.21 | 8.47 | 3.74 |
| C13 | 3.61 | 507,000 | 64% | 5.57 | 6.10 | 1.63 |
| C14 | 3.60 | 316,000 | 86% | 5.85 | 7.17 | 1.38 |
| C15 | 2.96 | 552,000 | 90% | 5.16 | 6.68 | 1.04 |
| C16 | 2.71 | 702,000 | 68% | 2.41 | 6.03 | 4.84 |
| C17 | 2.67 | 397,000 | 85% | 3.40 | 5.40 | 3.01 |
| C18 | 2.34 | 784,000 | 94% | 4.97 | 5.45 | 3.49 |
| C19 | 2.27 | 502,000 | 89% | 3.65 | 5.88 | 2.32 |
| C20 | 2.13 | 347,000 | 39% | 2.92 | 9.65 | 0.10 |
| C21 | 1.44 | 753,000 | 43% | 2.31 | 5.35 | 1.88 |
| C22 | 2.99 | 517,000 | 90% | 4.13 | 6.33 | 2.69 |

As can be seen from Table 1, the claimed slurry process (Examples 1-5) produces polyethylene with all four desired properties, namely good incorporation of the α-olefin as evidenced by greater than 5 tertiary carbons per 1000 carbons; low long-chain branching, as evidenced by a VEF less than 2.0; capable of forming polyethylene having a high weight-average molecular weight, as evidenced by $M_w$>250,000; and good hydrogen sensitivity, as evidenced by a greater than 60% reduction in $M_w$ in the presence of 0.82 mmoles of hydrogen per mole of ethylene.

Comparative Examples 6-22 demonstrate that this balance of desirable properties is unexpected. Very similar complexes fail to provide all four desired attributes. In particular, most bridged indenoindolyl complexes provide higher levels of long-chain branching as indicated by a viscosity enhancement factor>2. Comparative Example 21 shows a desirably low viscosity enhancement factor, but the sensitivity of molecular weight to hydrogen is a less-than-desirable 43%.

The preceding examples are meant only as illustrations. The following claims define the invention.

We claim:

1. A slurry process which comprises polymerizing ethylene at a temperature within the range of 40° C. to 90° C. in the presence of a $C_3$-$C_{10}$ α-olefin and a catalyst comprising an activator and a supported complex to produce polyethylene with good incorporation of the α-olefin and low long-chain branching as indicated by a viscosity enhancement factor of less than 2.0, wherein the process forms polyethylene having weight-average molecular weight greater than 250,000, wherein the process has good hydrogen sensitivity such that introduction of 0.82 mmoles of hydrogen per mole of ethylene into the liquid phase reduces the weight-average molecular weight by at least 60%, and wherein the complex has the structure:

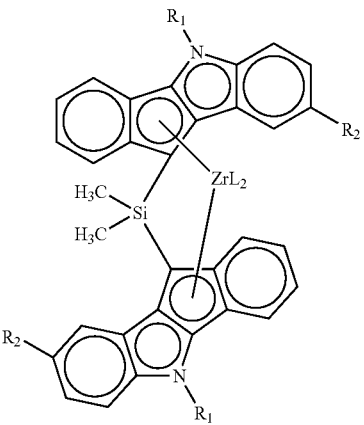

wherein each $R_1$ is independently selected from the group consisting of $C_1$-$C_6$ n-alkyl; each $R_2$ is independently selected from the group consisting of H and $C_1$-$C_{10}$ hydrocarbyl; and each L is independently selected from the group consisting of halide, alkoxy, aryloxy, siloxy, alkylamino, and $C_1$-$C_{30}$ hydrocarbyl.

2. The process of claim 1 wherein the activator is selected from the group consisting of alumoxanes, alkylaluminum compounds, organoboranes, ionic borates, ionic aluminates, aluminoboronates, and combinations thereof.

3. The process of claim 2 wherein the activator is methylalumoxane.

4. The process of claim 1 wherein $R_1$ is methyl.

5. The process of claim 1 wherein each L is Cl.

6. The process of claim 1 wherein the $C_3$-$C_{10}$ α-olefin is selected from the group consisting of 1-butene, 1-hexene, and 1-octene.

7. The process of claim 1 wherein the activity ratio as defined herein is greater than 2.

8. The process of claim 1 that forms polyethylene having a weight-average molecular weight greater than 400,000.

9. The process of claim 1 wherein 63 mmoles of 1-butene per mole of ethylene in the liquid phase forms polyethylene with greater than 5 tertiary carbons per 1000 carbons.

10. The process of claim 1 wherein the supported complex is supported on silica.

11. The process of claim 1 wherein the complex has the structure:

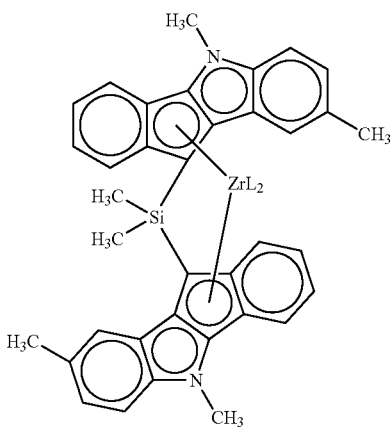

wherein each L is independently selected from the group consisting of halide, alkoxy, aryloxy, siloxy, alkylamino, and $C_1$-$C_{30}$ hydrocarbyl.

12. A slurry process which comprises polymerizing ethylene at a temperature within the range of 40° C. to 90° C. in the presence of a $C_3$-$C_{10}$ α-olefin and a catalyst comprising an activator and a supported complex to produce polyethylene with good incorporation of the α-olefin and low long-chain branching as indicated by a viscosity enhancement factor of less than 2.0, wherein the process forms polyethylene having a weight-average molecular weight greater than 250,000, wherein the process has good hydrogen sensitivity such that introduction of 0.82 mmole of hydrogen per mole of ethylene into the liquid phase reduces the weight-average molecular weight by greater than 60%, and wherein the complex has the structure selected from the group consisting of:

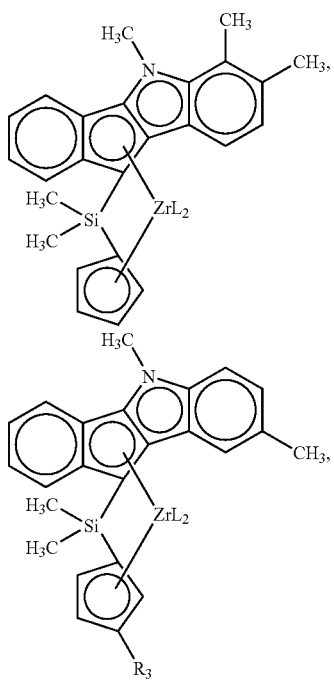

-continued

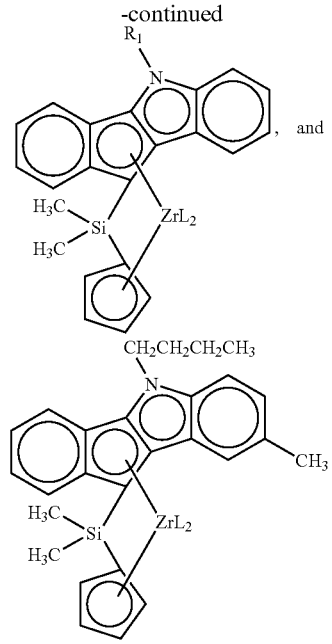

wherein $R_1$ is $C_1$-$C_6$ n-alkyl; $R_3$ is $C_1$-$C_6$ alkyl; and each L is independently selected from the group consisting of halide, alkoxy, aryloxy, siloxy, alkylamino, and $C_1$-$C_{30}$ hydrocarbyl.

13. The process of claim 12 wherein 63 mmoles of 1-butene per mole of ethylene in the liquid phase forms polyethylene with greater than 5 tertiary carbons per 1000 carbons.

14. The process of claim 12 wherein the complex has the structure:

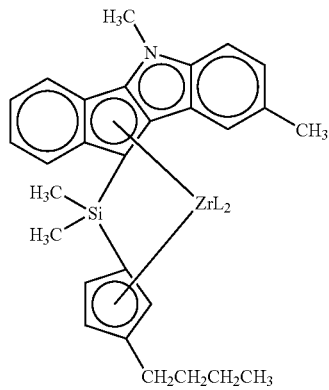

wherein each L is independently selected from the group consisting of halide, alkoxy, aryloxy, siloxy, alkylamino, and $C_1$-$C_{30}$ hydrocarbyl.

15. The process of claim 12 wherein the supported complex is supported on silica.

16. The process of claim 14 wherein the activity ratio as defined herein is greater than 2.

17. The process of claim 12 wherein the activator is selected from the group consisting of alumoxanes, alkylaluminum compounds, organoboranes, ionic borates, ionic aluminates, aluminoboronates, and combinations thereof.

18. The process of claim 12 wherein the activator is methylalumoxane.

* * * * *